United States Patent [19]

Martus

[11] Patent Number: 4,932,543

[45] Date of Patent: Jun. 12, 1990

[54] CHAMBERED BOTTLE CAP

[76] Inventor: Don Martus, 38235 Hazle Rd., Mt. Clemens, Mich. 48045

[21] Appl. No.: 292,758

[22] Filed: Jan. 3, 1989

[51] Int. Cl.⁵ .............................................. B65D 1/04
[52] U.S. Cl. ....................................... 215/6; 215/227; 215/247; 215/364
[58] Field of Search ........................... 215/6, 227, 247

[56] References Cited

U.S. PATENT DOCUMENTS 3,856,169 12/1974 Wilson et al. ............................ 215/6
4,502,604 3/1985 Martus ................................ 215/364 X
4,687,115 8/1987 Bongiovanni ........................ 215/355

Primary Examiner—Donald F. Norton
Attorney, Agent, or Firm—Gifford, Groh, Sprinkle, Patmore and Anderson

[57] ABSTRACT

A cork for a wine bottle is chambered to receive sediment when the bottle is inverted. A valve operable from the exterior of the cork can then be closed to trap the sediment within the cork. A resilient easily attached valve member ensures full closure, yet also enables introduction of additives to the wine.

11 Claims, 2 Drawing Sheets

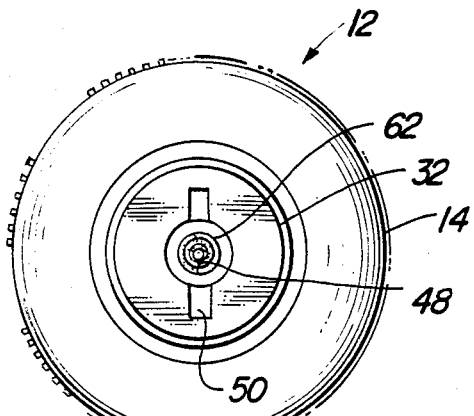
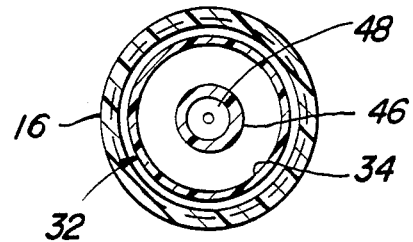
Fig-4        Fig-5
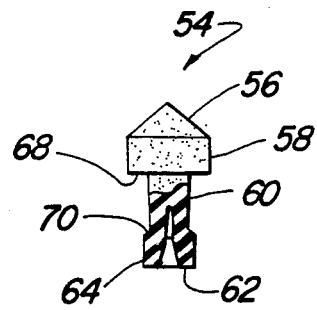
Fig-6
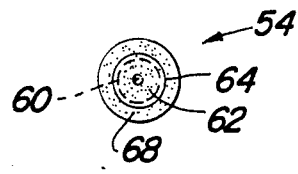
Fig-7
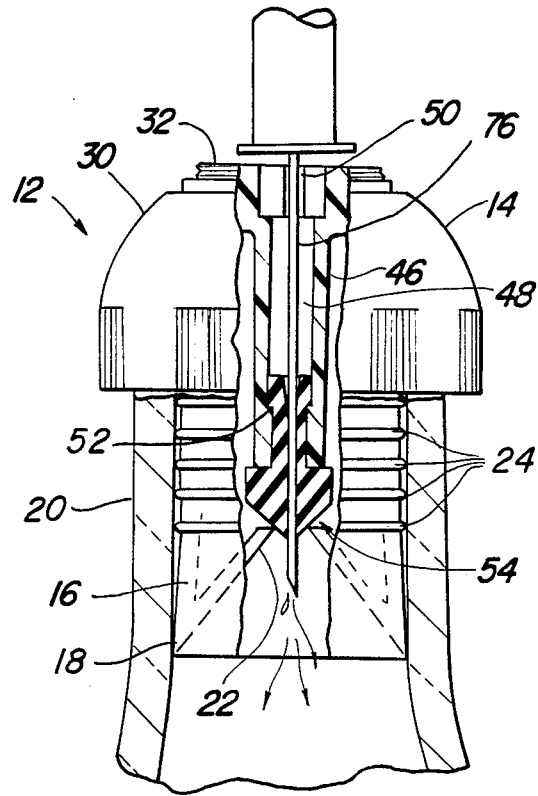
Fig-8

CHAMBERED BOTTLE CAP

BACKGROUND OF THE INVENTION

I. Field of the Invention

The invention relates to wine making and in particular to a means for separating sediment from bottled wine. More specifically the invention relates to caps for wine bottles which are designed to promote separation of the sediment from the wine while the bottle remains capped.

II. Description of the Prior Art

In the process of making wine particles of fruit and other particles remain mixed with the wine and must be removed before the wine is distributed for sale. Removal of the material is especially difficult with effervescent wines i.e. wines generally referred to as champagnes. Among the processes used for removing sediments from effervescent wines is the charmat process. This process uses pressurized tanks and equipment. Such equipment is expensive and the process is only economical when used for large commercial quantities of wine.

Other methods include those known generally as methode champenoise. In one such process, sediment is captured in frangible neck portions of elongated bottles. The necks are then frozen and the frangible portions removed from the bottles so the sediment can be discarded, and only purified wine will remain in the bottles. This type of operation is labor intensive, requires a substantial amount of apparatus for installation of a temporary cap, freezing, discarding of the neck collected substance, and recapping of the bottles.

It is also known to remove sediment from bottled wine by decanting. Decanting requires that the sediment be allowed to settle in the bottle and then the contents are poured from one bottle into another container. A certain amount of the wine must be retained in the bottle together with the sediment. Very often a substantial portion of the wine remains.

Another method of clarification particularly of wines other than the effervescent type is by the distillation process in which the wine is vaporized and then collected, cooled and condensed. This method also requires a substantial amount of apparatus and is time consuming. It substantially increases the cost of producing wine.

U.S. Pat. No. 4,502,604 granted Mar. 5, 1985 to Don Martus discloses a closure cap for a bottle which cap includes a chamber having an end normally open and in communication with the interior of the bottle. A plug closes the other end of the tubular housing and the plug is movable inwardly of the housing. The plug includes an elongated stem having a valve. By movement of the plug inwardly the valve will close against a seat formed in the open end of the housing so that sediment which has settled in the chamber when the bottle has been inverted will become trapped within the cap and remain separated from the contents of the bottle even though the bottle should then be turned top up.

U.S. Pat. No. 4,687,115 granted Aug. 18, 1987 to Bongiovanni discloses a cap for use in trapping sediment wherein the cap has a series of slots at it innermost end which leads to a chamber within the cap. The bottle can be tipped for the sediment to collect within the cap. Thereafter a second cylindrical body element can be screwed inwardly of the cap proper to close the slots and trap the sediment within the cap.

The Bongiovanni invention relies on an elongated threaded member to close a series of elongated slots extending around the periphery of the bottle cap and does not provide a simple valve structure.

SUMMARY OF THE INVENTION

The present invention provides a cork for trapping sediment in which a simple valve arrangement is employed, and in which the valve to valve seat arrangement comprises a resilient deformable member which can ensure proper sealing.

Further, the present invention employs more secure sealing between the cap members and between the cap and the bottle yet a simple easily formed and assembled structure is provided.

According to the invention means are also provided for readily locking the resilient member in one of the relatively movable valve members.

Another advantage retained by the present invention is the ability to dosage the wine by pressing a syringe through the closed cap without disturbing the trapped sediment and without opening of the valve. Dosage can be effected through the resilient valve member which can be compressed to continue to seal the valve opening after the syringe has been removed.

The present invention further includes the advantage of providing a simple and inexpensive means for separating sediment from wine in a bottle. Moreover, once the sediment has been separated, the cap will continue to seal the bottle. Also additives can be introduced to the wine without breaking the seal and thus the aging process can be controlled. When the cap is finally removed it can be cleaned and reused or discarded along with the sediment as desired. On the other hand the cap can remain on the bottle until the wine is finally consumed.

These and other advantages of the present invention will be more clearly described in the following detailed description.

BRIEF DESCRIPTION OF THE DRAWING

FIG. 4 is a top plan view of the cap of FIGS. 1–3.

FIG. 5 is a fragmentary sectional view taken along line 5—5 of FIG. 2 with some elements deleted.

FIG. 6 is a side elevation of a valve.

FIG. 7 is a bottom plan view of the valve of FIG. 6 and

FIG. 8 is a view similar to FIG. 3 but showing a dosage procedure.

DETAILED DESCRIPTION OF THE PREFERRED EMBODIMENT

Figure 2:
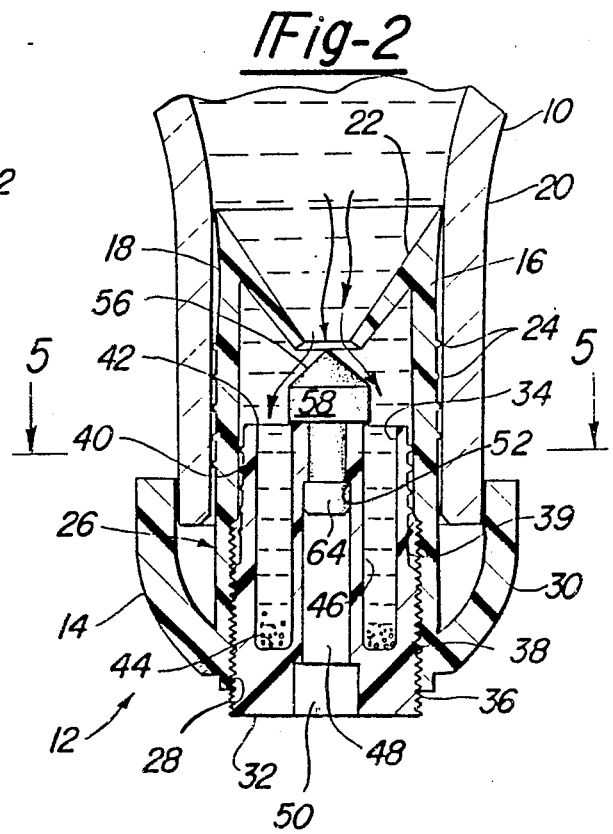
FIG. 2 is a fragmentary sectional view of the wine bottle and cap showing the bottle inverted to trap sediment in the cap and with the valve structure in open position.
Figure 1:
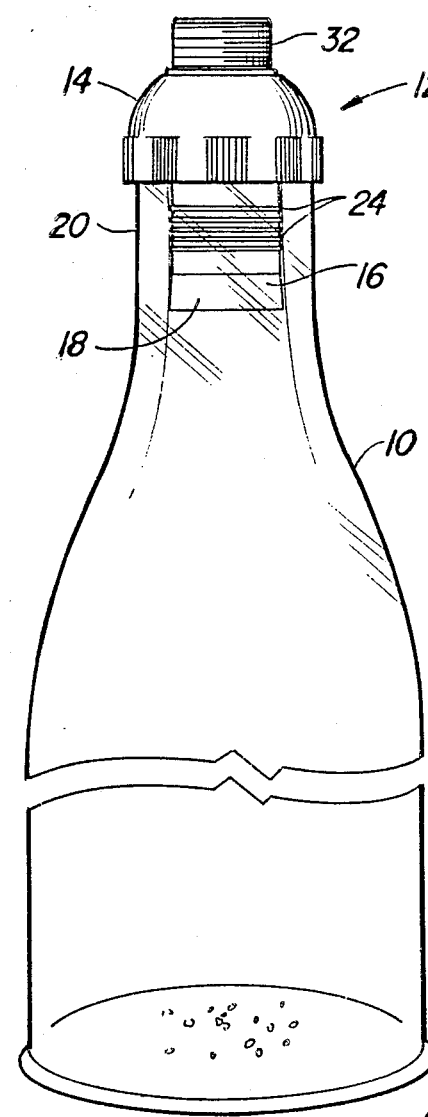
FIG. 1 is a fragmentary elevation of a wine bottle including a closure cap constructed according to the invention.
Figure 3:
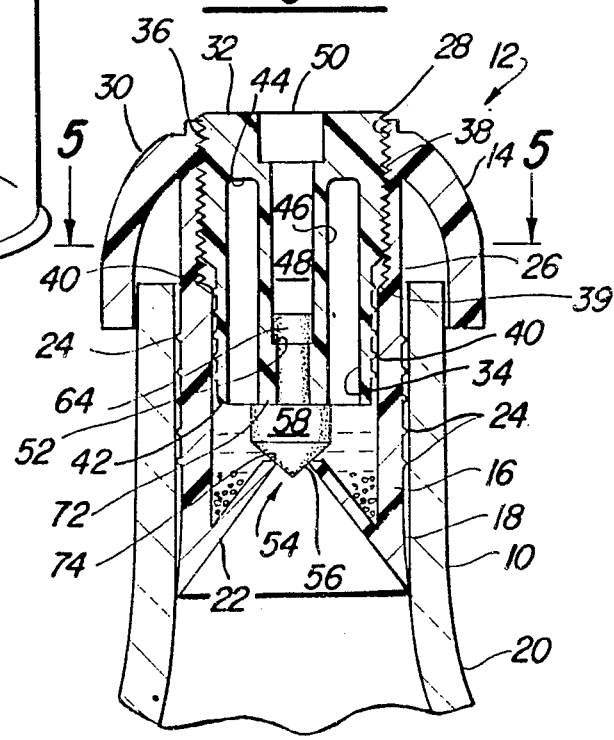
FIG. 3 is a fragmentary sectioned view showing the structure of FIG. 2 but with the valve element closed.

In FIGS. 1–3 there is shown a bottle 10 having a cap 14 according to the invention. The cap comprises a tubular outer housing member 16, see also FIGS. 4 and 9, having an elongated section 18 projecting inwardly of the bottle neck 20. The cap is formed of a synthetic material such as a polyethylene. The housing member has a conically-shaped inwardly converging lower end opening outwardly of the housing and defined by a wall 22 which lends rigidity to the housing. A series of circular sealing rings 24 are provided at spaced intervals along the housing member 16 in the outer wall thereof. Housing member 16 forms a central chamber open at its upper end. At its upper end housing member 16 is expanded outwardly to provide upper offset section 26 having a larger internal diameter than the lower section below it containing the wall 22. Section 26 opens outwardly to the top of the housing member and its internal surface is threaded at 28. Adjacent its upper end and integrally with section 26 there is provided a knob-like flange 30 which serves as a cover and a means for grasping the cork when inserting and removing the cork. A series of raised ribs can be provided around the outer periphery of the flange to facilitate gripping.

A second housing member, plug 32, resides within housing member 16. Plug 32 comprises an elongated cylindrical member having an inner, lower, section 34 and an outer, upper, section 36. The outer upper section 36 is larger in diameter than section 34 and is threaded at 38 so as to mate with threaded section 28 of member 14. A fine close fitting thread is used. It is seen that by rotation of plug 32, plug 32 can be moved inwardly and outwardly of member 16. The inner lower section 34 of plug 32 is of a size so as to present an interference fit between it and the inner surface of housing member 16 below the offset section 20 of the latter. Further a series of cylindrical rings 40 are positioned along section 34 of plug 32 to provide further interfering contact between the two housing members and help prevent leakage. The inwardly tapered section 39 facilitates entrance of lower section 34 of plug 32 into the lower section of housing member 16. The housing member 16 is further provided with an outwardly tapering lower inner end which has an uncompressed diameter larger than the internal diameter of the tapered bottle neck. The tapering lower end cooperates with rings 24 to further ensure a leak tight contact with the bottle. The internal pressure of plug 32 enhances the pressure of rings 24 against the bottle neck. It will be understood by those in the art that the bottle lip is typically beveled and provides for initial insertion of corks, and this beveled lip will facilitate entrance of cap 14.

Plug 32 also has a hollow central core open at its lower end 42 but closed at its upper end 44. A central column 46 extends from upper outer end 44 to lower inner end 42. Column 46 is integrally formed with end 44 and has a central opening, or conduit, 48 extending its full length. A screw driver type slot 50, see FIG. 4, is provided at the outer end 44 of plug 32, and is used for rotating plug 32 within housing member 16, as described below. Opening 48 extends into slot 50 and thus provides an opening for the exterior of cap 12 through the plug 32. Inwardly of the lower, inner, end of column 46 a transverse circular flange 52, integrally formed within column 46, see FIGS. 2, 3 and 8.

A valve member 54, FIGS. 6 and 7, is supported in column 46. Valve 54 has a conical face 56 extending from a cylindrical body 58 and also has a stem 60. Stem 60 has an enlarged end 62. End 62 is tapered inwardly along its outer surface.

Valve 54 is formed of a resilient material, whereas housing members 16 and 32 are formed of a comparatively rigid material which may be a polyethylene. The opening 48 is generally of the same diameter as stem 60, whereas ring 52 forms a restriction in opening 48 at its location. The distance between the base 68 of cylinder 58 and the inner surface 70 of enlarged end 62 of valve 54 is approximately the same as the distance between the inner end 72 of column 46 and the flange 52. Due to the resiliency of the valve, the stem of valve 54 can be forced downwardly within the opening in the channel 48 until the end 62 goes beyond the ring 52. Then upon release of the force pressing the valve downwardly the enlarged end will butt against ring 52 holding the valve in position on column 46 with base 68 seated on the inner end 72 of column 46.

Valve seat 74 is formed in wall 22 in facing relationship to valve 54. It is apparent that plug 32 can be rotated within housing member 16 to advance valve 54 into closed position on seat 74. The resilient nature of the valve ensures a proper seating and sealing of the inner chamber of the cap from the interior of the bottle.

In use the cap can be forced into the bottle neck to the position shown in FIGS. 2, 3, and 8. The plug 32 is initially in the valve open position wherein the valve 54 is spaced from its seat, FIG. 2. The bottle is then inverted with the cap in place and put in a wine rack. The bottle is riddled by rotating periodically as is customary to loosen any sediment that may cling to the bottle. The sediment works its way down through the valve seat 14 into the chamber in the housings 16 and 32. Once the vintnor is satisfied with the sediment situation, he then, utilizing a screw driver or similar tool, closes the valve opening by forcing the resilient valve 52 onto the valve seat. The sediment is now trapped within the cap. The cap remains sealed and the wine can to continue to age if preferred.

FIG. 8 illustrates that when the valve is closed additives can be introduced to the wine through the valve. This is possible by using a syringe type needle 76, plunging the same through the resilient valve and thereafter forcing the additive down into the wine. Upon removal the resilient nature of the valve will close the opening made by the thin needle. The bottle cap can also be secured by applying a wire harness in the known manner without interfering with the function of the cap.

The present invention thus provides a bottle closure which seals the wine within the bottle and yet permits the wine to be clarified while it remains sealed. In addition, the cap permits additives to be added even after the wine bottle has been sealed.

Having thus described my invention, many modifications thereto will become apparent to those skilled in the art to which the invention pertains, without deviation from the spirit of the invention as defined by the scope of the appended claims.

I claim:

1. A closure cap for a wine bottle comprising a first member forming a chamber open at one end and having a lower end, an inlet opening in said lower end defined by a valve seat,
   a second member comprising an elongated hollow central core open at its lower end and closed at its upper end received within said first member and closing said open end of said first member,
   said second member being in fluid sealed connection with said first member and said first member being adapted for fluid sealed connection with a wine bottle neck,
   a valve member on said second member in spaced relationship to said valve seat, said second member having a threaded section threadedly engaged with a like section of said first member and movable along said threaded section of said first member to advance said valve toward said seat and to withdraw said valve from said seat, said second member having a second section extending inwardly of said threaded section and having a portion frictionally bearing against the inner wall of said chamber of said first member to form a fluid tight seal therewith.

2. The closure cap of claim 1 including said first member having an elongated lower section designed to frictionally engage the inner wall of a wine bottle neck and forming said chamber and an upper section having a larger interior diameter than said lower section, said second member having a lower inner section received within said elongated lower section of said first member and frictionally bearing outwardly against the latter said lower section and urging the latter said section outwardly, said second member further having an outer upper section received within said upper section of said first member, said outer upper section of said second member having an external diameter greater than the corresponding diameter of said lower inner section of said second member and said outer upper section of said first member being in contact along mating threads with said outer upper section of said second member and means for rotating said second member within said first member along said threads.

3. The closure cap of claim 2 including sealing rings circumferentially arranged on said lower inner section of said second member and sealingly in engagement within said lower elongated inner section of said first member.

4. The closure cap of claim 2 including an inwardly tapered section extending inwardly between said outer upper section of said first member and said elongated lower section of said first member for facilitating entrance of said second member lower inner section into said elongated lower inner section of said first member.

5. A cap for sealing a bottle and removing residue from a fluid within said bottle while the bottle is sealed by said cap comprising a first member forming a chamber, and having an inner end provided with an opening into said chamber, said opening being defined by a valve seat, and said first member having an opposite end, a second member closing said opposite end of said first member and of said first member chamber and forming an extension of said chamber, said second member being in sealed but relatively movable association with said first member for movement inwardly and outwardly with respect to said valve seat, and a resilient valve supported on said second member and movable therewith into and out of closing relationship with said valve seat.

6. The cap of claim 5 including said valve comprising a valve face and a stem said stem being received within said second member and said stem retaining said valve in position.

7. The cap of claim 5 including said cap having a column extending upwardly within said chamber with respect to said opposite end, said valve being supported on said column in facing relationship to said valve seat.

8. The cap of claim 7 including said column having an opening formed therein, said valve having a stem secured in said opening and maintaining said valve in facing relationship to said seat.

9. The cap of claim 7 including said valve having a stem, said column having means forming an opening extending inwardly thereof, a ring like restriction in said opening, said valve having an enlarged section on its stem of a perimeter larger than the inner perimeter of said restriction, said stem being of a length such that said enlarged section of said stem can be forced inwardly of said column beyond said flange like restriction with said valve face being outwardly of said column.

10. The cap of claim 7 including said column having a central opening extending through said column from its inner end to the exterior of said cap, said valve being supported within said opening and having a valve body seated on said column inner end and closing the latter end of said opening.

11. The cap of claim 10 including said valve having a stem with an enlarged section, a restriction formed in said column central opening narrowing said opening and being inwardly of said inner end said restriction being narrower than said enlarged section of said stem, said resilient valve member stem extending into said central opening with said enlarged section being inwardly of said restriction.

* * * * *